W. S. HODGES.
SPRING.
APPLICATION FILED JAN. 3, 1911.

1,013,774.

Patented Jan. 2, 1912.

Witnesses:—
William A. Rivoir.
Walls A. Burrowes

Inventor:—
William S. Hodges.
by his Attorneys:—
Howson & Howson

UNITED STATES PATENT OFFICE.

WILLIAM S. HODGES, OF PHILADELPHIA, PENNSYLVANIA, ASSIGNOR, BY MESNE ASSIGNMENTS, TO THE BALDWIN LOCOMOTIVE WORKS, OF PHILADELPHIA, PENNSYLVANIA, A CORPORATION OF PENNSYLVANIA.

SPRING.

1,013,774.   Specification of Letters Patent.   Patented Jan. 2, 1912.

Application filed January 3, 1911. Serial No. 600,632.

*To all whom it may concern:*

Be it known that I, WILLIAM S. HODGES, a citizen of the United States, residing in Philadelphia, Pennsylvania, have invented certain Improvements in Springs, of which the following is a specification.

The object of this invention is to provide means for so coupling the clip to the end of the spring that it will be held rigidly thereon without the use of bolts, rivets or other fastenings.

Figure 1:
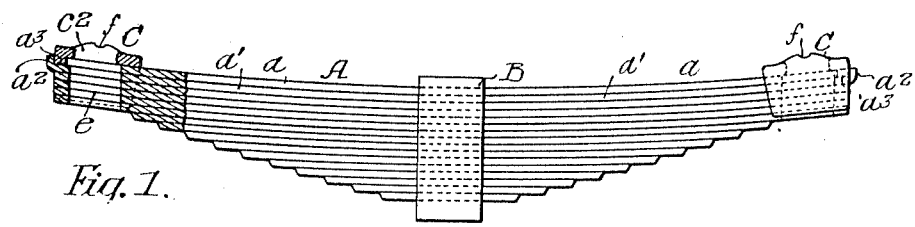
Figure 4:
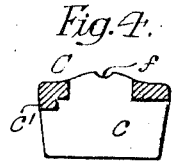
Figure 3:
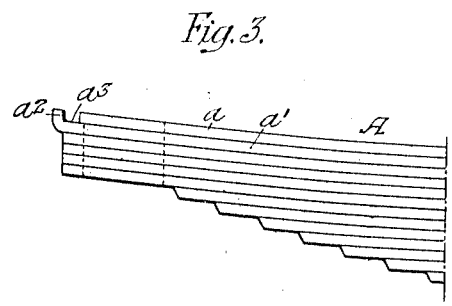
Figure 2:
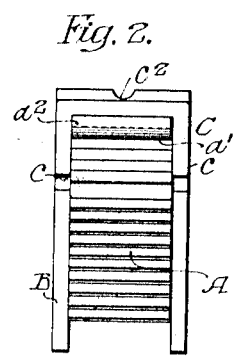
Figure 5:
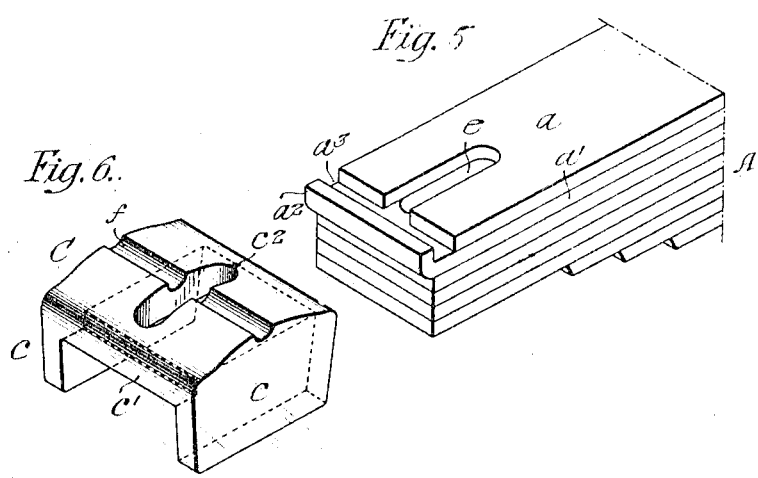
Figure 6:
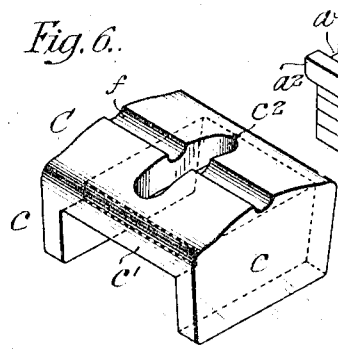

In the accompanying drawings:—Figure 1, is a side view, partly in section, of a semi-elliptic spring illustrating my improvement; Fig. 2, is an enlarged end view of the spring; Fig. 3, is a view of a portion of the spring; Fig. 4, is a detached sectional view of the clip; Fig. 5, is a perspective view of one end of the spring, and Fig. 6, is a detached perspective view of the clip.

A is the spring made up of a series of leaves held together by the central band B in the ordinary manner. Mounted on each end of the spring are clips C of the form illustrated clearly in Fig. 6. In order to prevent the clips from moving longitudinally on the spring they must be attached in some manner to one or more of the plates of the spring and the plates must also have a certain amount of independent movement. Each clip, in the present instance, is made, as shown in Fig. 6, having depending flanges $c$—$c$, which extend down on each side of the spring. The upper plate $a$ of the spring terminates short of the end, while the second plate $a'$, in the present instance, is longer than the other plates of the spring and is turned up to form a flange $a^2$. The parts are so proportioned that there is a space left between the end of the top plate and the flange $a^2$ forming a transverse recess.

The clip C has a depending lip $c'$, which is of such a width that it will fit snugly in the recess $a^3$ formed by the two plates $a$—$a'$ and the clip will thus be prevented from moving longitudinally on the spring, yet the leaves or plates of the spring will be free to have their independent movement.

In the present instance the clip has an opening $c^2$ which alines with the opening $e$ in the ends of the springs and the upper surface of the clip has a transverse groove $f$ to receive a pin. This type of spring is directly under the locomotive and the end of the spring is slotted for the passage of a link which connects the spring with the equalizing gear and the recess $f$ receives the transverse pin from which the link is suspended from the spring. In other types of springs the shape of the clip may be modified and instead of beveling the clip and the end of the spring the link may have an open center; being shaped so as to pass down on each side of the spring. The cross member of the link forms the pivot from which it is suspended and in some instances the side flanges $c$ of the clip may be more or less extended, depending considerably upon the use for which the spring is intended.

The main feature of the invention is the coupling by which the clip is prevented from moving longitudinally on the spring. In some instances, it may be necessary to provide the clip with a tapered lip $c'$ and in that event the first or second leaf of the spring may be cut away and the third member turned up.

I claim:

The combination of a spring made up of a series of leaves, the top leaf stopping short of the end of the spring, the second leaf being longer than the spring and turned up a distance from the end of the top leaf, forming a transverse recess, a clip having side flanges extending on each side of the spring, and a transverse depending lip at the outer end shaped to enter the recess between the end of the top leaf of the spring and the flange.

In testimony whereof, I have signed my name to this specification, in the presence of two subscribing witnesses.

WILLIAM S. HODGES

Witnesses:
 WM. E. SHUPE,
 WM. A. BARR.